Patented June 2, 1953

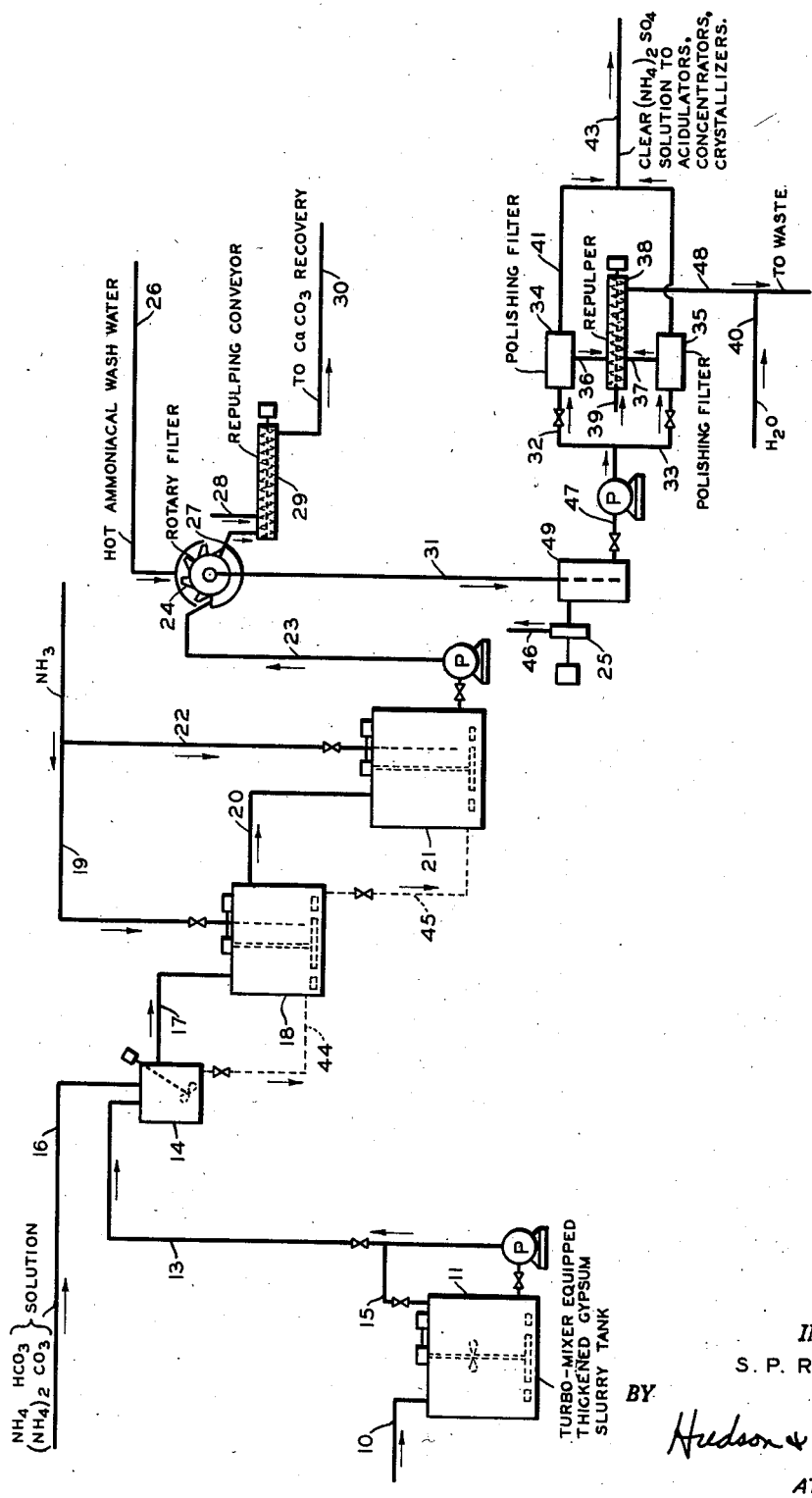

2,640,757

UNITED STATES PATENT OFFICE 2,640,757

PRODUCTION OF AMMONIUM SULFATE AND CALCIUM CARBONATE

Sam P. Robinson, Bartlesville, Okla., assignor to Phillips Petroleum Company, a corporation of Delaware Application September 23, 1949, Serial No. 117,450

12 Claims. (Cl. 23—119)

This invention relates to the manufacture of ammonium sulfate. In one of its more specific aspects it relates to the production of ammonium sulfate and by-product calcium carbonate by the Merseberg process modified to utilize a maximum quantity of the calcium sulfate charged and to produced readily filterable calcium carbonate which may be further cleaned of its siliceous impurities. In one embodiment, it relates to a process for obtaining high yields of ammonium sulfate.

It is the usual practice to carry out the Merseberg reaction by suspending the fresh gypsum feed in recycle dilute ammonium sulfate solution obtained from the filters which separate the products of the reaction. This feed slurry is then passed to one or more reaction vessels where ammonium carbonate solution is added in a slight excess. I have found that there are certain disadvantages to this type of operation one of which is the formation of very slimy, small particle size, calcium carbonate. A solution containing such a slimy precipitate is obviously difficult to filter. Further, the slime often coats the calcium sulfate reactant and the silica impurities, slowing down the reaction and causing difficulty in purification of the by-product calcium carbonate.

The calicum sulfate is appreciably soluble in the ammonium sulfate solution and when an ammonium carbonate solution is added, the dissolved calcium sulfate reacts rapidly with the aqueous solution of ammonium carbonate causing very, very fine, slimy crystals of calcium carbonate to form. Another disadvantage of this type of operation is that the reaction raises the temperature of the ammonium carbonate to such an extent that a portion thereof is decomposed to give ammonium bicarbonate and ammonia. Thus ammonia escapes from the reaction solution and suitable recovery means must be provided. Because a portion of the ammonia may be lost in this manner, the quantity of ammonium carbonate is reduced thus allowing the formation of what I have found to be an insoluble calcium sulfate-calcium carbonate complex which remains in the by-product calcium carbonate causing loss of calcium sulfate and contamination of the calcium carbonate. I have also found that if excess ammonium carbonate is added to the reaction to retard formation of this insoluble calcium sulfate-calcium carbonate complex, the excess alkalinity has a very undesirable agglomerating effect on the calcium carbonate. Thus, both calcium sulfate and siliceous materials which are impurities become coated with fine calcium carbonate, causing a slow down of the desired reaction and prevention or inhibition of separation of the calcium carbonate and siliceous material.

An object of this invention is to provide an improved process for the manufacture of ammonium sulfate.

Another object of this invention is to provide a process for the manufacture of amonium sulfate and calcium carbonate.

Still another object is to provide an improvement in the Merseberg process for making ammonium sulfate by the reaction of gypsum or calcium sulfate with ammonium carbonate wherein high yields of good quality products are obtained.

Another object is to provide a calcium carbonate by-product which may be easily and economically separated from siliceous impurities by froth flotation.

Another object is to provide a process for the manufacture of ammonium sulfate and calcium carbonate by the reaction of calcium sulfate with ammonium carbonate wherein maximum conversion of the calcium sulfate is obtained and readily filterable, purifiable calcium carbonate is produced.

Another object is to provide a rapid process for the manufacture of high quality ammonium sulfate.

Another object is to provide a process for the manufacture of ammonium sulfate by the reaction of calcium sulfate with ammonium carbonate wherein loss of ammonia by decomposition of ammonium carbonate to ammonium bicarbonate is prevented.

Further objects and advantages of this invention will be apparent to one skilled in the art from the accompanying disclosure and discussion.

I have discovered an improved method for carrying out the reaction of calcium sulfate with ammonium carbonate to produce ammonium sulfate and calcium carbonate known to those skilled in the art as the Merseberg reaction, whereby formation of a slimy calcium carbonate and a calcium sulfate-calcium carbonate complex are substantially prevented. I have also discovered a method for reducing the loss of ammonia due to decomposition of ammonium carbonate, and for recovery of relatively pure ammonium sulfate and calcium oxide products.

In accordance with one embodiment of my invention gypsum or calcium sulfate is slurried in water rather than ammonium sulfate solution and is then passed to a first reaction stage. The reaction rate is maintained under control and the slimy calcium carbonate precipitate which often coats the gypsum and siliceous impurities therein is prevented. Further, a calcium carbonate of good particle size is obtained which may be readily filtered from a solution and which may be easily separated from siliceous and other solid impurities by means of froth flotation. This calcium carbonate is of such a character that a flotation process which is economical and which uses a minimum of flotation agent may be carried out.

In a preferred embodiment of the invention, the aqueous slurry of gypsum containing from 40 to 60 weight per cent gypsum and preferably 50 to 55 weight per cent is contacted first in a small reaction zone with ammonium carbonate, the pH of the reaction mixture in this zone being controlled in the range of 6.0 to 8.0 by the use of ammonium bicarbonate as a pH buffer or regulator. Sufficient quantities of both ammonium carbonate and ammonium bicarbonate are utilized to insure 45 to 85 mol per cent conversion of the gypsum to ammonium sulfate and calcium carbonate in this zone and to lower the pH below 8.0. Depending on the temperatures and the concentration of dissolved solids, the first reaction stage should have a residence time of about 2 to 5 minutes in a continuous process. By operating in this manner a slime-free calcium carbonate is obtained which has little tendency to agglomerate upon itself or adhere to gypsum or silica particles.

The product from the first reaction zone is then passed to a second reaction zone in which anhydrous or aqueous ammonia contacts the same to convert more of the ammonium bicarbonate to ammonium carbonate and thus more of the calcium sulfate to ammonium sulfate and calcium carbonate, and to increase the pH of the reaction mixture. Because crystal formation of the calcium carbonate has already been initiated in the first reaction zone the presently formed calcium carbonate will make these crystals grow rather than forming a slime or new crystal nuclei. The ammonium carbonate content is also increased to force the reaction of substantially all of the calcium sulfate.

The product from the second reaction zone is then passed to a third reaction zone where sufficient ammonia is added to convert all of the ammonium bicarbonate to ammonium carbonate and thereby raise the pH of the reaction mixture above 9 and preferably above 9.2. In this manner, the reaction is forced to completion, i. e., all of the calcium sulfate is reacted leaving a solution containing an excess of ammonium carbonate which prevents the formation of undesired calcium carbonate-calcium sulfate complex. This product is filtered to remove the precipitated calcium carbonate and the insoluble impurities such as silica which are often present when the calcium sulfate used is gypsum. The excess ammonium carbonate is reacted with sulfuric acid thus providing still more ammonium sulfate.

Suitable reaction conditions which may be used when a three-stage reaction is carried out are listed in Table I which follows:

*Table I*

| Reaction Stage | 1 | 2 | 3 |
|---|---|---|---|
| Retention time, minutes | 2-5 | 10-20 | 30-90 |
| pH | 6-8 | 8-9 | 9-10 |
| Excess ammonium carbonate, g/l | 5-15 | 15-30 | 30-50 |
| Temperature, °C | 40-45 | 38-42 | 36-40 |
| Gypsum conversion, wt. percent | 40-85 | 85-95 | 95-99 |

It is apparent that when only two reaction zones or more than three reaction zones are utilized the operating conditions will be carried out somewhat differently from those given above in Table I. However, the above conditions will be a guide for such changes which can readily be made by those skilled in the art in view of the present disclosure.

A more detailed understanding of some of the many aspects of my invention may be had by referring to the attached drawing, which is a schematic flow diagram of a preferred embodiment of my invention, along with the following discussion. Various additional valves, pumps, and other conventional equipment necessary for the practice of this invention will be familiar to one skilled in the art and have been omitted from the drawing for the sake of clarity. This description of the drawing provides one method of operating my process, however, it is understood that while this is representative in general of my process, various minor changes may be made in adapting the process to the various conditions within the scope of the invention.

Refer now to the attached flow diagram. An aqueous slurry of gypsum is thickened and then passed via line 10 to thickened gypsum slurry tank 11. The thickening step is often necessary because gypsum in an aqueous medium is often a plant waste or is slurried because of ease in handling. The thickened gypsum is passed from slurry tank 11 via line 13 to reactor 14 wherein it is contacted with an aqueous solution of ammonium carbonate-ammonium bicarbonate introduced via line 16. Line 15 is provided when greater circulation than can be provided by the mixing device is desirable. The gypsum reacts with the ammonium carbonate to produce ammonium sulfate and calcium carbonate, utilizing about 40 to 85 weight per cent of the gypsum. The reaction mixture which is contacted for a relatively short time in reactor 14 is continuously passed via line 17 to reactor 18. In reactor 18, the mixture is contacted with ammonia introduced thereto via line 19. It is desirable that this reactor be of a larger volume and have less agitation than reactor 14, because as the gypsum becomes used up, it requires a greater length of time for that which remains to react. The ammonia introduced to this reactor via line 19 is supplied to react with the ammonium bicarbonate used as a pH buffer or regulator in reactor 14, thus forming additional ammonium carbonate to react with the remaining gypsum. The reaction product from reactor 18 is continuously withdrawn via line 20 and passed to reactor 21 which is still larger than reactor 14 and has still less agitation. The final ammonium carbonate-gypsum reaction takes place in this reactor providing a CaSO₄ conversion of 95 to 99 weight per cent. The greater size of the reactor is necessary for the same reason that reactor 18 is larger than reactor 14. Additional ammonia is introduced to reactor 21 via lines 19 and 22 to react with the remaining ammonium bicarbonate in the reaction mixture, converting it to ammonium carbonate and making it available for reaction with the gypsum, thus aiding in forcing complete reaction of the gypsum.

Following 95 to 99 per cent conversion of the CaSO4, the reaction mixture is withdrawn from reactor 21 via line 23 and is passed to filter 24. Any suitable filter, such as a rotary filter, may be used which will separate the calcium carbonate and other insoluble precipitate from the aqueous ammonium sulfate liquor. Hot ammoniacal wash water is introduced to filter 24 via line 26 and is utilized to displace ammonium sulfate solution from the filter cake, thus recovering maximum coverted ammonium sulfate and producing a low sulfate content calcium carbonate. The solid filter cake is removed from filter 24 via chute 27 and is passed therethrough to a repulping conveyor 29 which forms an aqueous slurry with the calcium carbonate with water introduced via line 28. The repulped calcium carbonate is removed from the repulping conveyor via line 30 and may be further purified or otherwise treated. The aqueous ammonium sulfate filterate is removed from filter 24 via line 31 and is passed through separator 49, from which the air is removed via pump 25 and line 46, and is passed therefrom to line 47. This filtrate is then passed from line 47 via lines 32 and 33 to polishing filters 34 and 35, respectively, whereby any residual solid material is removed from the liquor. These filtration and washing steps are practiced to provide a substantially ammonium sulfate free calcium carbonate and a calcium carbonate free ammonium sulfate. Without the hot alkaline wash and polishing filtration products of desired high purity are not obtainable. The separated solid material is passed from the polishing filters through lines 36 and 37 to repulping conveyor 38. Water is introduced to this conveyor via line 39 to provide for repulping of the removed solids. The repulped material is removed from the conveyor via line 48. Additional water is introduced via line 40 to aid in carrying off the solid material and passing same to waste. Filtrate is removed from filters 34 and 35 via lines 41 and 42 and is passed therethrough to line 43. In a preferred embodiment of my invention, the thus separated filtrate is contacted with sulfuric acid so that the residual dissolved ammonium carbonate and bicarbonate is converted to ammonium sulfate, thus increasing the total yield. After acidulation, the ammonium sulfate liquor may be handled as desired. For example, it may be passed to concentrators and crystallizers whereby solid ammonium sulfate crystals are obtained in known manner, or it may be used in the liquid state.

The decrease in agitation in the reaction vessels referred to hereinabove and in the appended claims refers to the rate at which the material therein is intermixed such as the turbulence of the mixture. It does not refer necessarily to the rate at which a mechanical mixer is operated or the difference in size of agitator blades, and the like.

An alternative method for passing the reaction product from reactor 14 to 18 and 18 to 21 is indicated by dashed lines 44 and 45. In this way, the reaction product is withdrawn from the bottom of the first two reactors and is introduced to the bottom of the last two reactors. This may be a desirable procedure when the solids content is particularly high, or when complete draining of the reactors is desired.

Advantages of this invention are illustrated by the following example. The reactants and their proportions, and other specific ingredients are presented as being typical and should not be construed to limit the invention unduly.

*Example*

A portion of by-product gypsum from fertilizer manufacture of the following chemical analysis and wet screen analysis is slurried with sufficient water to give a 52 per cent solids aqueous suspension.

| Chemical Analysis | | Wet Screen Analysis | |
|---|---|---|---|
| Compound | Weight Percent | Size | Weight |
| CaO | 30.30 | 65 mesh | 1.0 |
| SO3 | 43.50 | 100 mesh | 2.3 |
| P2O5 | 0.62 | 150 mesh | 6.8 |
| Al2O3 | 0.66 | 200 mesh | 24.4 |
| Fe2O3 | 0.01 | 325 mesh | 11.3 |
| SiO2 (Quartzite) | 3.90 | 25 microns | 11.9 |
| Other Silicates | 0.60 | 15 microns | 10.7 |
| Water | 20.41 | 15 microns | 31.6 |
| Total | 100.00 | | 100.0 |

On the basis of a batch production of 30 lbs. of ammonium sulfate in 30 per cent aqueous solution, 34 lbs. of the above analysis gypsum (25 lbs. ± CaSO4 content) in a 52 per cent solid slurry is reacted with 13.5 lbs. of ammonium carbonate and 6.85 lbs. of ammonium bicarbonate in a 40 per cent solution in a first reactor for a controlled retention or reaction time of 2 minutes. At the end of this time 70 weight per cent of the calcium sulfate is converted to ammonium sulfate and calcium carbonate and there will be an excess of .10 weight per cent of unused ammonium carbonate. The pH of the mixture is approximately 7.0 and the temperature will rise to 44° C.

The reaction residue will then be heated and reacted with 0.84 lb. of anhydrous ammonia which reaction changes a portion of the ammonium bicarbonate to ammonium carbonate and thus raises the pH of the mixture to approximately 8.8. After 15 minutes reaction time the calcium sulfate conversion will be approximately 90 per cent completed.

The reaction mixture is then passed to a third reactor which is the third stage of the three stage system wherein the remaining ammonium bicarbonate is reacted with 6.4 lbs. of anhydrous ammonia which still further raises the pH of the mixture to about 9.3. After about 75 minutes reaction time the calcium sulfate content will be approximately 99 per cent converted with residual ammonium carbonate in solution equivalent to 25 per cent of the theoretical requirement for complete conversion of calcium sulfate. After the 75 minute finishing reaction, the product may be filtered and the precipitate washed with hot (at least 50° C.) ammoniacal wash water. The filtrate is then neutralized with 4.6 lbs. of 98 per cent sulfuric acid to react with the excess ammonium carbonate. The resulting materials are a 30 per cent solution of ammonium sulfate product, and calcium carbonate by-product low in sulfate, which is readily filterable and suited for froth flotation separation to remove residual silica.

By operating my process as described above, I am able to convert the calcium sulfate content of gypsum or anhydrite (—200 mesh) with an efficiency of 98.5 to 99 weight per cent and at the same time produce a crystalline calcium carbonate of 5 to 10 microns average particle diameter which is readily filterable and free of large agglomerates that might prevent subsequent froth flotation away from siliceous impurities should further purification of the calcium carbonate be desirable.

Although this process has been described and exemplified in terms of its preferred modifications, it is understood that various changes may be made without departing from the spirit and scope of the disclosure and of the claims.

I claim:

1. A process for the manufacture of ammonium sulfate and calcium carbonate which comprises reacting an aqueous slurry of calcium sulfate and an aqueous solution of ammonium carbonate in a plurality of reaction zones in the presence of a minor quantity of ammonium bicarbonate, said reaction zones being of progressively larger size and of decreasing agitation, passing the reactants and sufficient ammonium bicarbonate to maintain the pH between 6 and 8 to the first of said reaction zones, passing the effluent from said first reaction zone to subsequent reaction zones where sufficient ammonia is added to react with the ammonium bicarbonate and increase the pH from that in the first zone up to 9 to 10 in the last zone, maintaining a progressively increasing residence time in the reaction zones, separating product ammonium sulfate and calcium carbonate, and recovering high yields of ammonium sulfate and easily purified calcium carbonate.

2. A process according to claim 1 wherein the calcium sulfate is slurried in the absence of an ammonium sulfate solution.

3. A process according to claim 1 wherein said ammonium sulfate is removed from the insoluble calcium carbonate by filtration.

4. A process for the manufacture of ammonium sulfate and slime-free calcium carbonate which comprises reacting an aqueous slurry of calcium sulfate and an aqueous solution of ammonium carbonate in a plurality of reaction zones in the presence of a minor quantity of ammonium bicarbonate, said reaction zones being of progressively larger size and of decreasing agitation, passing the reactants and ammonium bicarbonate to the first of said reaction zones wherein the pH is maintained between 6 and 8, passing the effluent from said first reaction zone to subsequent reaction zones wherein sufficient ammonia is added to react with the ammonium bicarbonate and thereby progressively increasing the pH so that it is within the range of 9 to 10 in the final reaction zone, maintaining a progressively increasing residence time in said zones the total of which is in the range of 42 to 115 minutes, maintaining a progressively decreasing temperature range in said zones from 40 to 45° C. down to 36 to 40° C., and by so operating obtaining a calcium sulfate conversion up to 99 weight per cent, separating the thus produced ammonium sulfate and calcium carbonate by filtration, and passing same to suitable recovery processes.

5. A process according to claim 4 wherein said calcium sulfate and ammonium carbonate are reacted in the absence of an inital solution of ammonium sulfate.

6. A process according to claim 4 wherein said reaction is carried out in three stages.

7. A process according to claim 4 wherein the ammonium sulfate solution is treated with sufficient sulfuric acid to react with the remaining ammonium carbonate therein.

8. A process for the manufacture of ammonium sulfate and slime-free calcium carbonate, which comprises reacting an aqueous slurry of calcium sulfate and an aqueous solution of ammonium carbonate in three stages in the presence of a minor quantity of ammonium bicarbonate, said reaction zones being of progressively larger size and of decreasing agitation, passing the reactants and ammonium bicarbonate to the first of said reaction zones with the ammonium carbonate being present in a 5 to 15 gram per liter excess, utilizing a sufficient volume of ammonium bicarbonate in said first reaction zone such that a pH of 6 to 8 is maintained, maintaining a residence time in said first reaction zone in the range of 2 to 5 minutes, passing the effluent from said first reaction zone to a second reaction zone to which sufficient ammonia is added to react with the ammonium bicarbonate and converting a portion of same to ammonium carbonate and thereby increasing the excess of ammonium carbonate to within the range of 15 to 30 grams per liter, maintaining a residence time within said second zone in the range of 10 to 20 minutes, passing the effluent from said second reaction zone to a third reaction zone to which sufficient ammonia is added to react with the remaining ammonium bicarbonate thereby providing an excess of ammonium carbonate in the range of 30 to 50 grams per liter and increasing the pH to within the range of 9 to 10, maintaining a residence time within said third zone in the range of 30 to 90 minutes, and separating the thus produced ammonium sulfate and calcium carbonate by filtration.

9. A process according to claim 8 wherein the temperature in the first reaction zone is 40 to 45° C., in the second zone is 38 to 42° C., and in the third zone is 36 to 40° C.

10. A process according to claim 8 wherein the thus produced ammonium sulfate solution is contacted with sufficient sulfuric acid to react with the excess ammonium carbonate therein, converting it to ammonium sulfate.

11. A process according to claim 8 wherein the total calcium sulfate conversion in the three reaction zones is respectively 40 to 85 weight per cent, 85 to 95 weight per cent, and 95 to 99 weight per cent.

12. In a process according to claim 8 passing the effluent from the third reaction zone to a filter wherein it is separated, washing the filter cake with ammoniacal wash water, passing the thus separated soluble materials to a polishing filter, and then passing the filtrate therefrom to sulfuric acid acidulation.

SAM P. ROBINSON.

References Cited in the file of this patent

UNITED STATES PATENTS

| Number | Name | Date |
|---|---|---|
| 1,152,244 | Vis | Aug. 31, 1915 |
| 1,152,245 | Vis | Aug. 31, 1915 |
| 1,902,649 | Larsson | Mar. 21, 1933 |

OTHER REFERENCES

Mellor, Inorganic and Theoretical Chemistry, vol. 2, pp. 787–8, Longmans, Green and Co. 1922, London, Eng.